(12) United States Patent
Mann

(10) Patent No.: US 7,651,113 B1
(45) Date of Patent: Jan. 26, 2010

(54) COMPACT FIFTH WHEEL LOCKING MECHANISM

(75) Inventor: Steven William Mann, Gardendale, AL (US)

(73) Assignee: Fontaine Fifth Wheel Company, Trussville, AL (US)

( * ) Notice: Subject to any disclaimer, the term of this patent is extended or adjusted under 35 U.S.C. 154(b) by 165 days.

(21) Appl. No.: 11/715,066

(22) Filed: Mar. 6, 2007

Related U.S. Application Data

(60) Provisional application No. 60/779,733, filed on Mar. 7, 2006.

(51) Int. Cl.
*B62D 53/10* (2006.01)
*B62D 53/12* (2006.01)
(52) U.S. Cl. ..................................... 280/434
(58) Field of Classification Search ......... 280/433–437; 292/14, 18, 24, 30, 32, 35, 126, 220, 223, 292/226, 304
See application file for complete search history.

(56) References Cited

U.S. PATENT DOCUMENTS

| | | | |
|---|---|---|---|
| 3,034,805 A * | 5/1962 | Becker ..................... 280/434 |
| 3,630,545 A | 12/1971 | Fontaine |
| 3,844,584 A | 10/1974 | Fontaine |
| 4,946,183 A * | 8/1990 | Benson et al. ............... 280/434 |
| 5,516,137 A | 5/1996 | Kass et al. |
| 5,516,138 A * | 5/1996 | Fontaine ..................... 280/434 |
| 5,641,174 A | 6/1997 | Terry et al. |
| 5,839,745 A | 11/1998 | Cattau et al. |
| 5,988,665 A | 11/1999 | Terry et al. |
| 6,352,277 B1 | 3/2002 | Timmings |
| 6,402,176 B1 | 6/2002 | Timmings |
| 2004/0145150 A1 * | 7/2004 | Yeakel ..................... 280/433 |
| 2007/0194555 A1 * | 8/2007 | Roberts et al. ............... 280/434 |

* cited by examiner

*Primary Examiner*—Tony H. Wiiner
*Assistant Examiner*—Wesley Potter
(74) *Attorney, Agent, or Firm*—George P. Kobler; Lanier Ford Shaver & Payne, PC

(57) ABSTRACT

In a fifth wheel hitch, a locking mechanism for retaining a trailer kingpin within a fifth wheel slot. The locking mechanism includes a jaw assembly comprised of a cam arm pivotally attached at one end to the underside of the hitch plate, a bumper arm pivotally attached by one of its ends to the cam arm, a sliding jaw with a recess for receiving the kingpin shank, and a secondary lock member, pivotally attached at a point intermediate its two ends to the rear portion of the cam arm. The locking mechanism also includes a main spring to pull the free end of the cam arm toward a closed position. A release rod is coupled at one end to secondary lock member at an attachment point that is disposed away from the lock member's axis.

13 Claims, 4 Drawing Sheets

COMPACT FIFTH WHEEL LOCKING MECHANISM

CROSS-REFERENCE TO RELATED APPLICATIONS

This application claims priority of U.S. Provisional Application Ser. No. 60/779,733, filed Mar. 7, 2006, which is incorporated by reference herein.

BRIEF DESCRIPTION OF THE DRAWINGS

The present invention is described with reference to the accompanying drawings. In the drawings, like reference numbers indicate identical or functionally similar elements.

DETAILED DESCRIPTION

The various embodiments of the present invention and their advantages are best understood by referring to FIGS. 1 through 5A&B of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," or "outward," or the like, and derivatives thereof are to be understand in relation to the truck or vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1A:
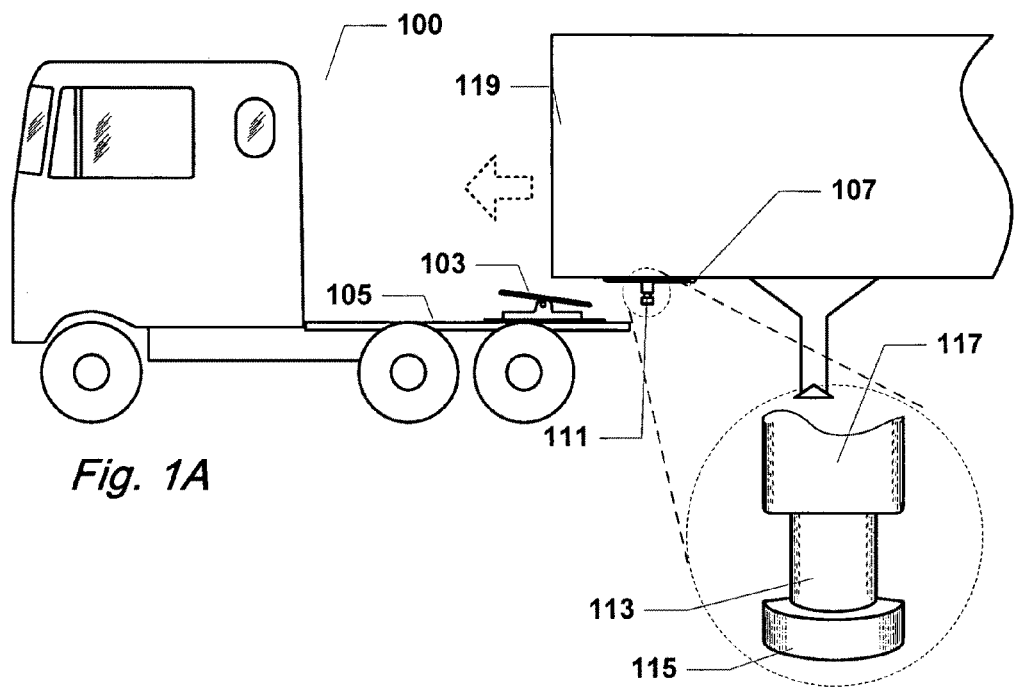
FIG. 1A is an exemplary tractor truck and trailer with a fifth wheel hitch.
Figure 1B:
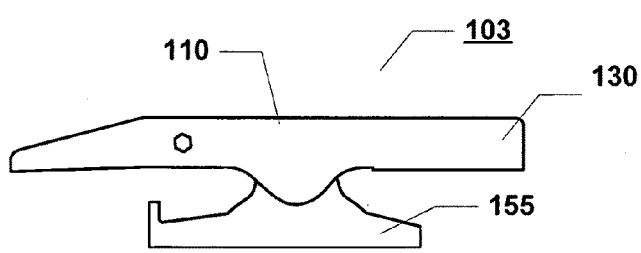
FIG. 1B is an exemplary fifth wheel hitch.
Figure 1C:
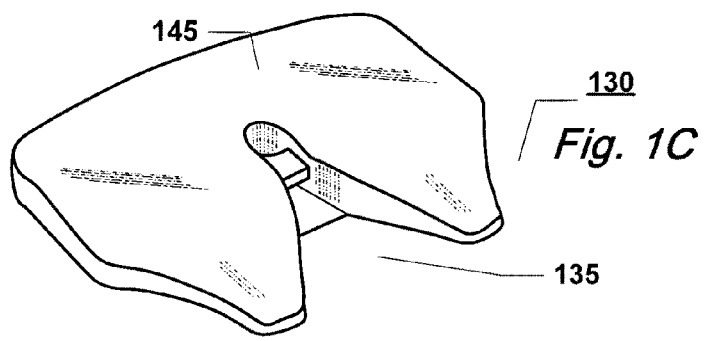
FIG. 1C is a hitch plate.

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (not shown but described in greater detail below) with slot 135 opening toward the aft end of fifth wheel assembly 110 for receiving a kingpin 111 from trailer 119.

Kingpin 111 typically extends from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 2:
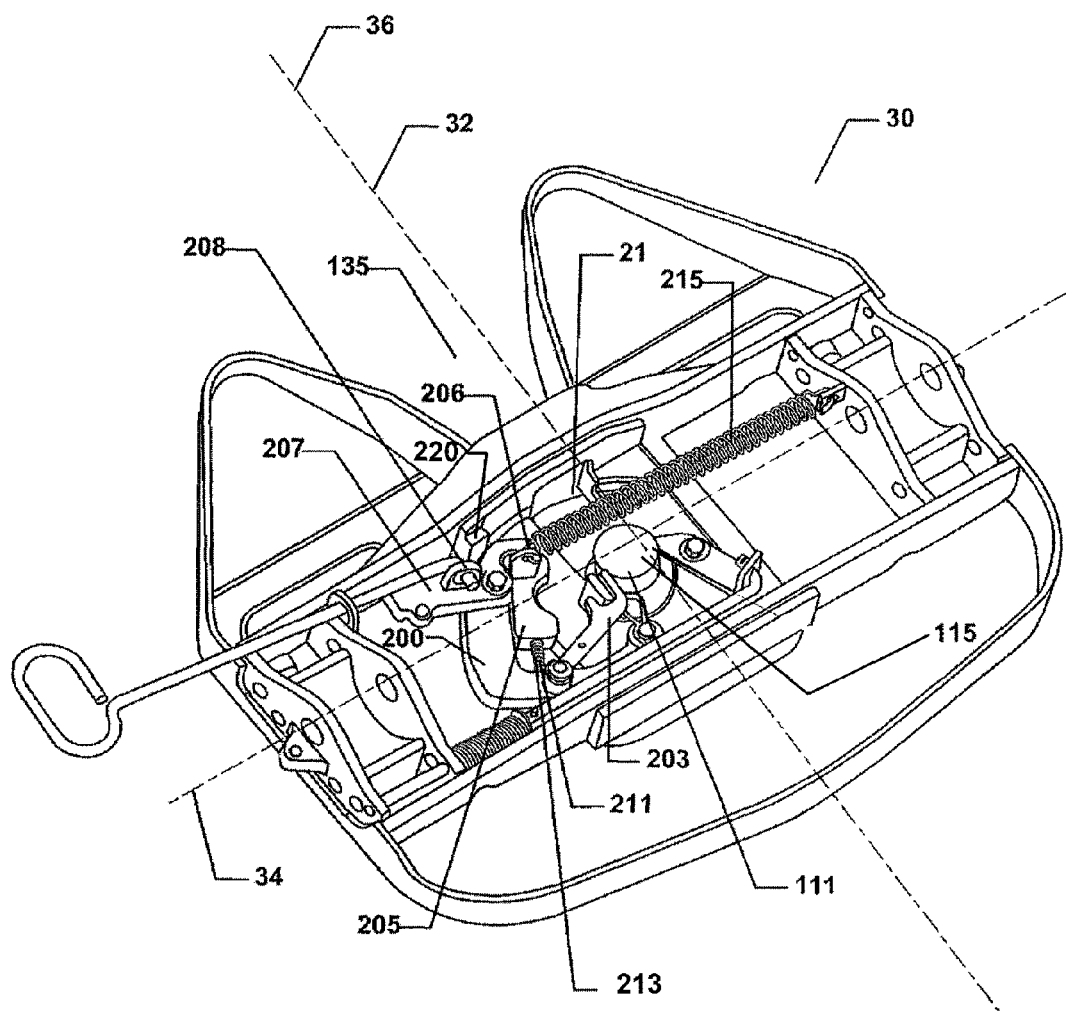
FIG. 2 is a perspective view of the underside of a hitch plate with a locking mechanism.

FIG. 2 depicts the underside of a hitch plate assembly referenced generally at 30, configured with a locking mechanism. The longitudinal axis of the hitch assembly is indicated at 32 and is congruent with the longitudinal axis of the truck upon which the fifth wheel is installed. The transverse axis is shown at 34. The hitch assembly aft end 36 includes a slot 135 to receive a trailer kingpin 111 and that opens to the rear of the truck. The hitch plate includes a throat area 21 that is dimensioned to receive the kingpin shank portion 113.

The locking mechanism includes a jaw assembly 200, shown in greater detail in FIGS. 3A, B, which comprises a cam arm 201 pivotally mounted at one end to the underside of the hitch plate with a cam pin. A bumper arm 203 is pivotally mounted by one end to the underside of the cam arm. A sliding jaw 205 is seated within the cam arm 201 slidably mounted to a slide pin 211 which extends from the inside of the cam arm. A first compression spring 213 surrounds the pin 211 and biases the sliding jaw 205 away from the inside of the cam arm 201 holding it toward the interior end of the cam arm. In this way, it is held in proper position to engage the kingpin when the lock is closed. A secondary lock 207 is pivotally mounted to the underside of the cam arm 201. The secondary lock 207 includes a first eyelet 206 at the interior end of the secondary lock 207 to which one end of a main spring 215 is attached. The main spring 215 is a tension spring and has an opposing end that is attached to the frame of the hitch plate on the side of the hitch plate opposite the cam arm 201. Main spring 215 imparts tension to bias the jaw assembly toward the closed position. Additionally, in this embodiment, the main spring 215 also applies a bias to rotate the secondary lock, pulling the first eyelet forward and the free end aftward. Therefore, the outward end of the main spring 215 is attached to the hitch plate frame at a point somewhat forward relative to the secondary lock. The purpose for this will become apparent in the detailed discussion below. The secondary lock 207 also includes a second eyelet 208 to which is pivotally attached a locking handle.

Bumper 203 is configured with a first aftward extending finger at its interior end and a second aftward extending finger from a location laterally from the first extending finger. The space defined by the first and second bumper fingers allows the bumper to rest upon a bumper stop 204 that extends downwardly from the underside of the hitch plate. A torsion spring acts to bias bumper toward the bumper stop 204.

Figure 3:
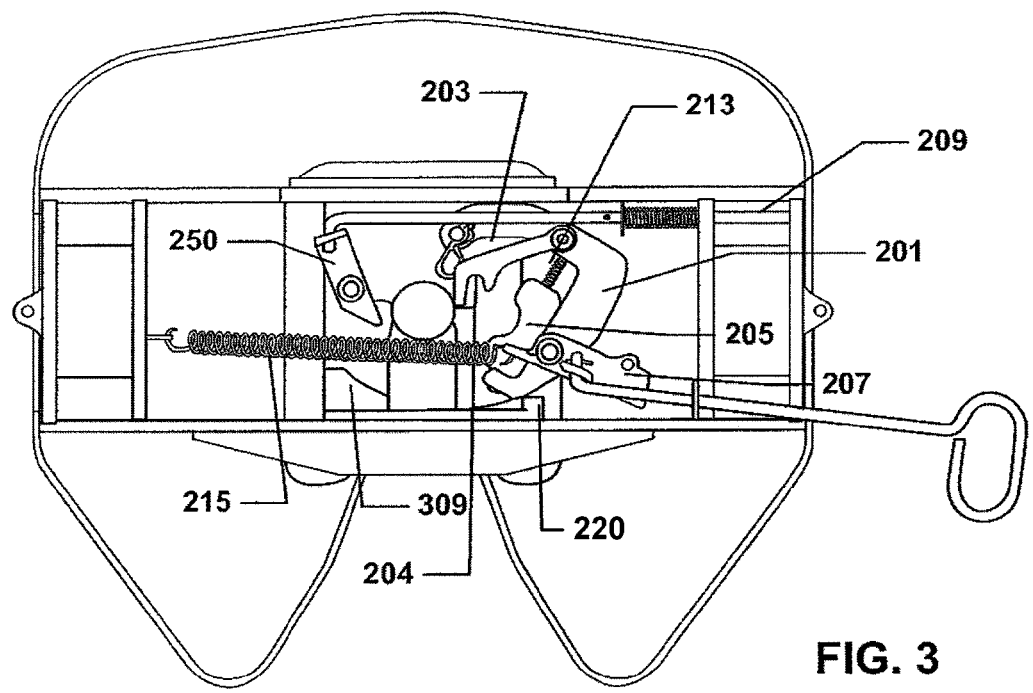
FIG. 3 is a plan view of the underside of a hitch plate with a locking mechanism.

Operation of the locking mechanism will now be described. FIG. 3 depicts the locking mechanism in the open position and there is no kingpin received in the throat area. At this point, main spring 215 imparts tension on the free end of the cam arm 201 through attachment to the secondary lock 207 to close. Cam arm 201 is held in the open position by the attached bumper 203 because the bumper's second aftward extending finger is seated against the bumper stop 204 preventing lateral movement of the jaw assembly 200. In this position, the sliding jaw 205 is held in the retracted position by an centrally-tending crook in the cam arm 201.

Figure 4:
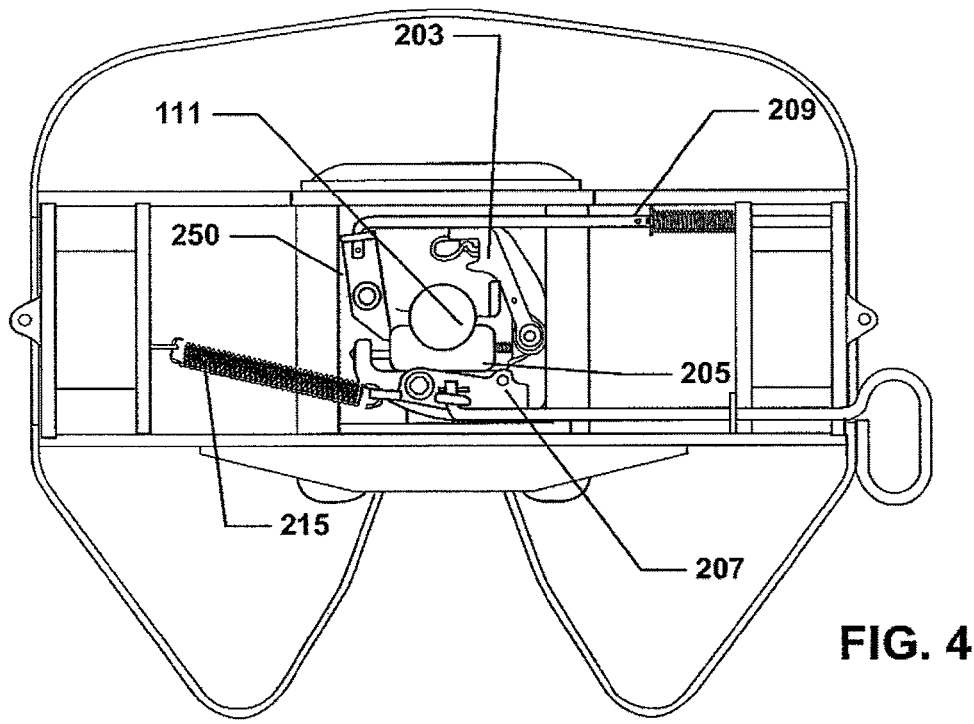
FIG. 4 is another plan view of the underside of a hitch plate with a locking mechanism.

With reference now to FIG. 4, a trailer kingpin is received through opening 135 into throat area 21. When the kingpin engages the forward end of the throat, the lower flange of the kingpin contacts the first aftward extending finger of the bumper 203. Continued forward motion of the kingpin thereby pushes the bumper 203 forward releasing it from the bumper stop 204. Once the bumper 203 is fully clear of the bumper stop 204, the jaw assembly is free to react the tension imparted by the main spring and begins to swing laterally to the closed position.

As the jaw assembly swings to the closed position, the sliding jaw 205 contacts the aftward side of the kingpin 111 along its shank. Sliding jaw 205 is configured with a recess that seats snugly against the rear circumference of the kingpin shank. When the jaw assembly 200 reaches the fully closed position, shown in FIG. 4, sliding jaw 205 is fully seated against the rear side of the kingpin and remains in that position though the cam arm continues to swing fully closed as the sliding jaw rides along the jaw pins by which the sliding jaw is slidably mounted to the cam arm 201. Additionally, the hitch plate frame includes a curved portion (FIG. 3, at 309) into which the curved portion of the cam arm 201 nestles. This allows the transfer of loads from the kingpin 111 to the hitch plate frame.

The closing of the jaw assembly 200 also moves the secondary lock member 207 toward the interior of the hitch plate and aft of the sliding jaw 205. A lock release rod is attached by curved end inserted through the second eyelet of the secondary lock at an attachment point that is aftward of the center axis of the rotatable secondary lock. The rod extends outwardly beyond the frame of the hitch plate and includes a terminal handle grip at its opposing end. The closing movement of the jaw assembly also draws the lock release rod inward by virtue its connection to the secondary lock 207.

Additionally, as the secondary lock 207 is drawn toward the interior its free, lateral end is rotated aftward through the tension imparted by the main spring. A detent 220 extending forward from aft frame member of the hitch plate prevents full rotation of the secondary lock until the lock member free end clears the detent 220. At that point, the free end rotates aftward so that it extends aftward past beyond the detent 220. If other forces are applied to the lock, the secondary lock member 207 prevents the lock mechanism from disengaging.

A lock indicator shaft 209 is connected at one end to a rotating member that is pivotally mounted to the underside of the hitch plate. The indicator extends laterally from the interior of the hitch plate. The outer frame of the hitch plate includes one or more apertures through which the indicator shaft may extend when the lock is in the closed position as will be described more fully below. The indicator shaft 209 preferably includes a compression spring acting upon a flange circumferentially disposed about the indicator shaft for a counter-force to bias the indicator toward the interior of the hitch plate.

When the lock is in the open position, the indicator shaft 209 is pulled toward the interior of the hitch plate and so, not easily visible. As the sliding jaw 205 slides to fully engage the kingpin and the jaw assembly 200 rotates to the closed position, the end of the sliding jaw 205 contacts and moves a free end of the rotating member 250 which, in turn pushes the indicator rod laterally to extend through the hitch plate frame. The extension of the rod through the frame is, therefore, an indication to the operator that the lock is engaged. Preferably, the tip of the rod visible on the outside of the hitch plate is a bright, easily visible color.

Opening the lock to disengage the kingpin is accomplished by exerting a outward pulling force on the lock release rod, the interior end of which is attached to the secondary lock. The off-axis attachment of the rod to the secondary lock 207 causes the secondary lock 207 to rotate in a counter-clockwise direction, as viewed in the figures so that the free end rotates forward and clears the detent. Pulling force also rotates the cam arm 201 until its crooked end catches the aft corner of the sliding jaw 205. Then as the cam arm 201 rotates, it pulls the sliding jaw 205 with it and away from the kingpin 111. The bumper 203 rotates aft and is drawn laterally until it engages the bumper stop 204, locking the jaw assembly in the open position. It should be noted that when the lock is initially disengaged, the first finger of the bumper 203 is drawn up from the kingpin 111 and is forced into the space between the kingpin 111 and the bumper stop 204. This prevents the lock from closing, allowing it to remain open while the operator can drive the truck from under the trailer and draw the fifth wheel away from the kingpin.

Figure 5A:
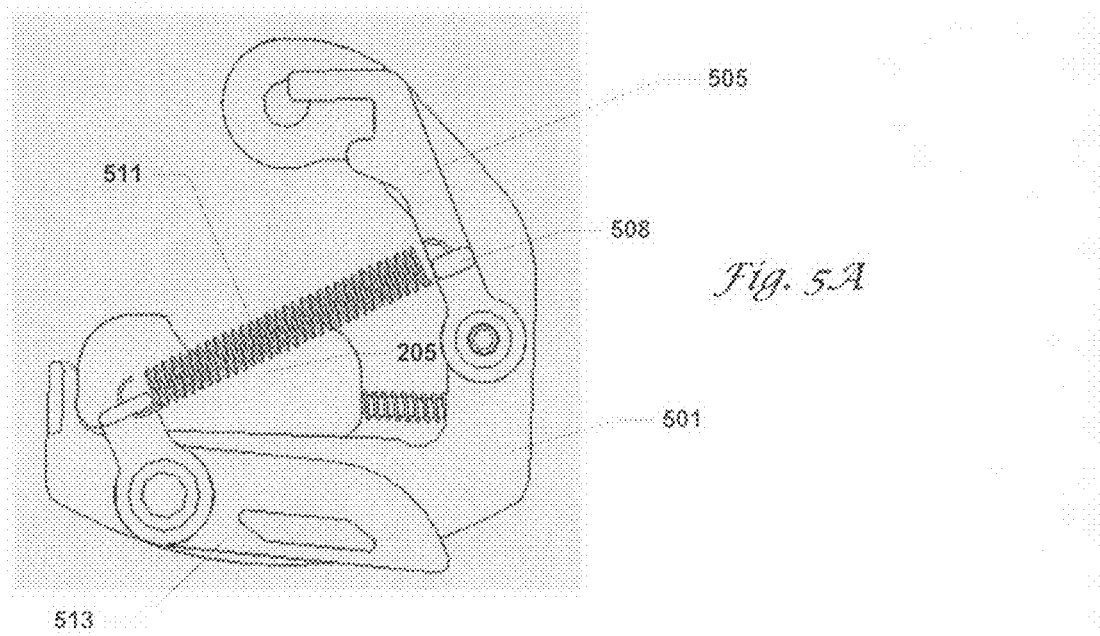
FIGS. 5A & B are views of a further embodiment of the jaw assembly.
Figure 5B:
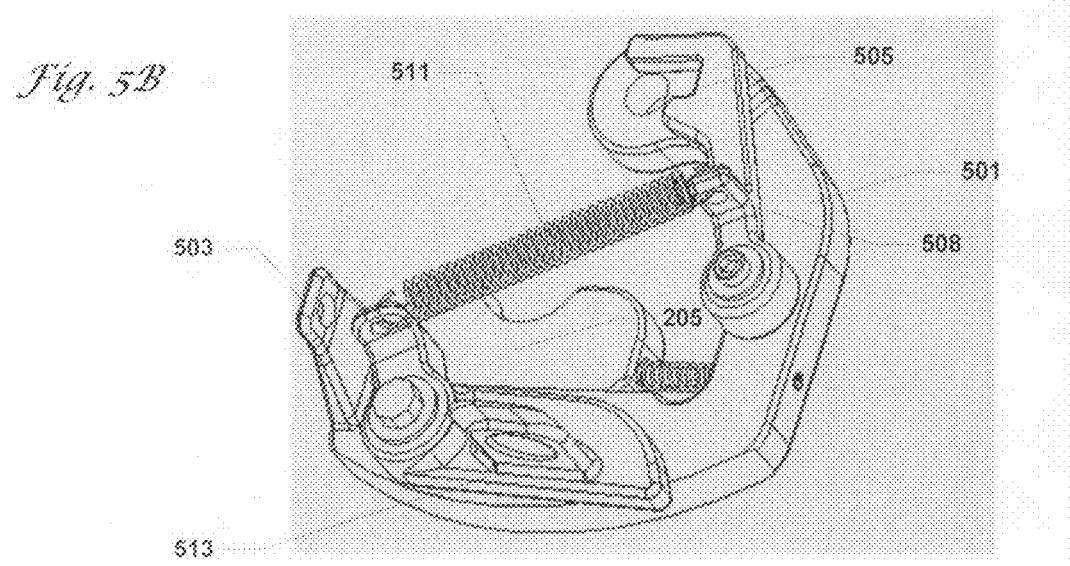

A further embodiment is described with reference to FIGS. 5A, B. Cam arm 501 includes an eyelet 503 extending downwardly away from the underside of the hitch plate that serves as the attachment point for the main spring. Sliding jaw 205 is seated against the forward wall of the aft portion of the arm and held in place as described in the previous embodiment. Bumper 505 is pivotally attached at one end to the lateral portion of the cam arm 501. In this embodiment, bumper 505 is configured with an down-extending flange in which an eyelet 508 is defined that serves as an attachment point for a second tension spring 511. Secondary lock 513 is again pivotally attached at a point intermediate its two ends having a downward flange defining an aperture that serves as an attachment point for the lock release rod. As in the previously described embodiment, the release rod attachment flange is off-axis so that pulling on the release rod cause the secondary lock to rotate. The opposing end of the secondary lock includes an attachment point for the opposing end of the second tension spring so that second tension spring imparts pulling force to both the bumper and the secondary lock.

In operation, the lock mechanism elements cooperate in substantially the same manner as that of the previously described embodiment with some exceptions. In this embodiment, the second tension spring provides a bias force to rotate the secondary lock clockwise (when viewed from the underside of the hitch plate). Thus, when the cam arm rotates to the fully closed position and the free end of the secondary lock clears the detent, the secondary lock is free to rotate and its free end rotates aftward.

In opening the lock, when the lock release rod is pulled, the off-axis attachment of the rod makes the secondary lock rotate counter-clockwise bringing the free end above the detent as it and the jaw assembly is drawn open. This movement also causes the bumper to move laterally. The second tension spring exerts a pull force on the bumper to rotate it aftward, and engage the bumper stop flange in the open position described above. This insures the lock remains open while the kingpin is withdrawn.

As described above and shown in the associated drawings, the present invention comprises a compact fifth wheel locking mechanism. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A fifth wheel hitch having a hitch plate with a rear opening throat area for receiving a trailer kingpin, and a locking mechanism for retaining said kingpin within said throat area, said locking mechanism comprising:
   a jaw assembly for enclosing around the rear portion of said kingpin received within said throat area comprising:
      a cam arm having a longitudinal leg transitioning to a transverse leg and pivotally attached by one end of the longitudinal leg to the underside of the hitch plate adjacent the throat area and operable for allowing the transverse leg to swing across the throat, said transverse leg terminating with an unattached end having an inward curving extension;
      a bumper arm pivotally attached at one end to said cam arm, said bumper arm being configured with first and second finger members extending rearward from an end opposing said attached bumper end;
      a sliding jaw member slidably mounted to an inner portion of said cam arm and biased toward said inward curving extension, said sliding jaw member having a recess shaped to receive a kingpin shank;
      a secondary lock member pivotally mounted at a point intermediate first and second ends of said secondary lock member to a rear portion of said cam arm, said secondary lock member having first attachment point disposed rearward from the center of said lock member;
   a first tension member having a first end attached to said jaw assembly at a point proximal to said unattached end of said cam arm and a second end attached to an outward portion of said hitch underside;
   a detent extending from a rear portion of the throat area for engaging said second end of said secondary lock member and preventing outward movement thereof.

2. The hitch of claim 1, wherein said lock mechanism further comprises a lock indicator rod operable to extend beyond a lateral frame of said hitch plate when the jaw assembly fully encloses the kingpin, said indicator rod including a retracting bias means.

3. The hitch of claim 1, further comprising a release rod having a first end coupled to said first attachment point of said secondary lock member such that lateral movement of said release rod causes said secondary lock member to rotate free of said detent.

4. The hitch of claim 3, wherein said lock mechanism further comprises a lock indicator rod operable to extend beyond a lateral frame of said hitch plate when the jaw assembly fully encloses the kingpin, said indicator rod including a retracting bias means.

5. The hitch of claim 1, wherein said first end of said first tension member is attached to said unattached end of said cam arm.

6. The hitch of claim 5, further comprising a second tension member attached to bumper and said secondary lock to bias the respective ends thereof toward each other.

7. The hitch of claim 6, wherein said lock mechanism further comprises a lock indicator rod operable to extend beyond a lateral frame of said hitch plate when the jaw assembly fully encloses the kingpin, said indicator rod including a retracting bias means.

8. The hitch of claim 6, further comprising a release rod having a first end coupled to said first attachment point of said secondary lock member such that lateral movement of said release rod causes said secondary lock member to rotate free of said detent.

9. The hitch of claim 8, wherein said lock mechanism further comprises a lock indicator rod operable to extend beyond a lateral frame of said hitch plate when the jaw assembly fully encloses the kingpin, said indicator rod including a retracting bias means.

10. The hitch of claim 1, wherein said first end of said first tension member is attached to the inward end of said secondary lock member.

11. The hitch of claim 10, wherein said lock mechanism further comprises a lock indicator rod operable to extend beyond a lateral flame of said hitch plate when the jaw assembly fully encloses the kingpin, said indicator rod including a retracting bias means.

12. The hitch of claim 10, further comprising a release rod having a first end coupled to said first attachment point of said secondary lock member such that lateral movement of said release rod causes said secondary lock member to rotate free of said detent.

13. The hitch of claim 12, wherein said lock mechanism further comprises a lock indicator rod operable to extend beyond a lateral frame of said hitch plate when the jaw assembly fully encloses the kingpin, said indicator rod including a retracting bias means.

* * * * *